United States Patent [19]
Naka et al.

[11] Patent Number: 5,138,126
[45] Date of Patent: Aug. 11, 1992

[54] WIRE CUT TYPE ELECTRIC DISCHARGE MACHINE

[75] Inventors: Shigeaki Naka; Kazuaki Hino, both of Aichi, Japan

[73] Assignee: Mitsubishi Denki K.K., Tokyo, Japan

[21] Appl. No.: 555,013

[22] Filed: Jul. 20, 1990

[30] Foreign Application Priority Data

Jul. 27, 1989 [JP] Japan ................... 1-194604

[51] Int. Cl.⁵ ............................ B23H 7/02; B23H 7/10
[52] U.S. Cl. .................................................. 219/69.12
[58] Field of Search ................ 219/69.12, 69.17, 69.16

[56] References Cited

U.S. PATENT DOCUMENTS

| | | | |
|---|---|---|---|
| 4,324,970 | 4/1982 | Nanasawa et al. | 219/69.12 |
| 4,521,662 | 6/1985 | Kinoshita et al. | 219/69.12 |
| 5,051,553 | 9/1991 | Kinoshita | 219/69.12 |
| 5,055,649 | 10/1991 | Iwasaki et al. | 219/69.12 |

FOREIGN PATENT DOCUMENTS

| | | | |
|---|---|---|---|
| 56-119327 | 9/1981 | Japan | 219/69.17 |
| 59-73232 | 4/1984 | Japan | . |
| 59-152021 | 8/1984 | Japan | . |
| 64-51229 | 2/1989 | Japan | 219/69.17 |

Primary Examiner—Geoffrey S. Evans
Attorney, Agent, or Firm—Sughrue, Mion, Zinn, Macpeak & Seas

[57] ABSTRACT

An apparatus and method for automatically removing, in an initial stage of a machining operation, a contact of a wire cut type electrode and a workpiece to be machined by an electric discharge generated between the electrode and the workpiece. With such an apparatus and method, even if there occurs a contact between the electrode and workpiece, the electric discharge machining operation can be started according to an NC machining program.

5 Claims, 5 Drawing Sheets

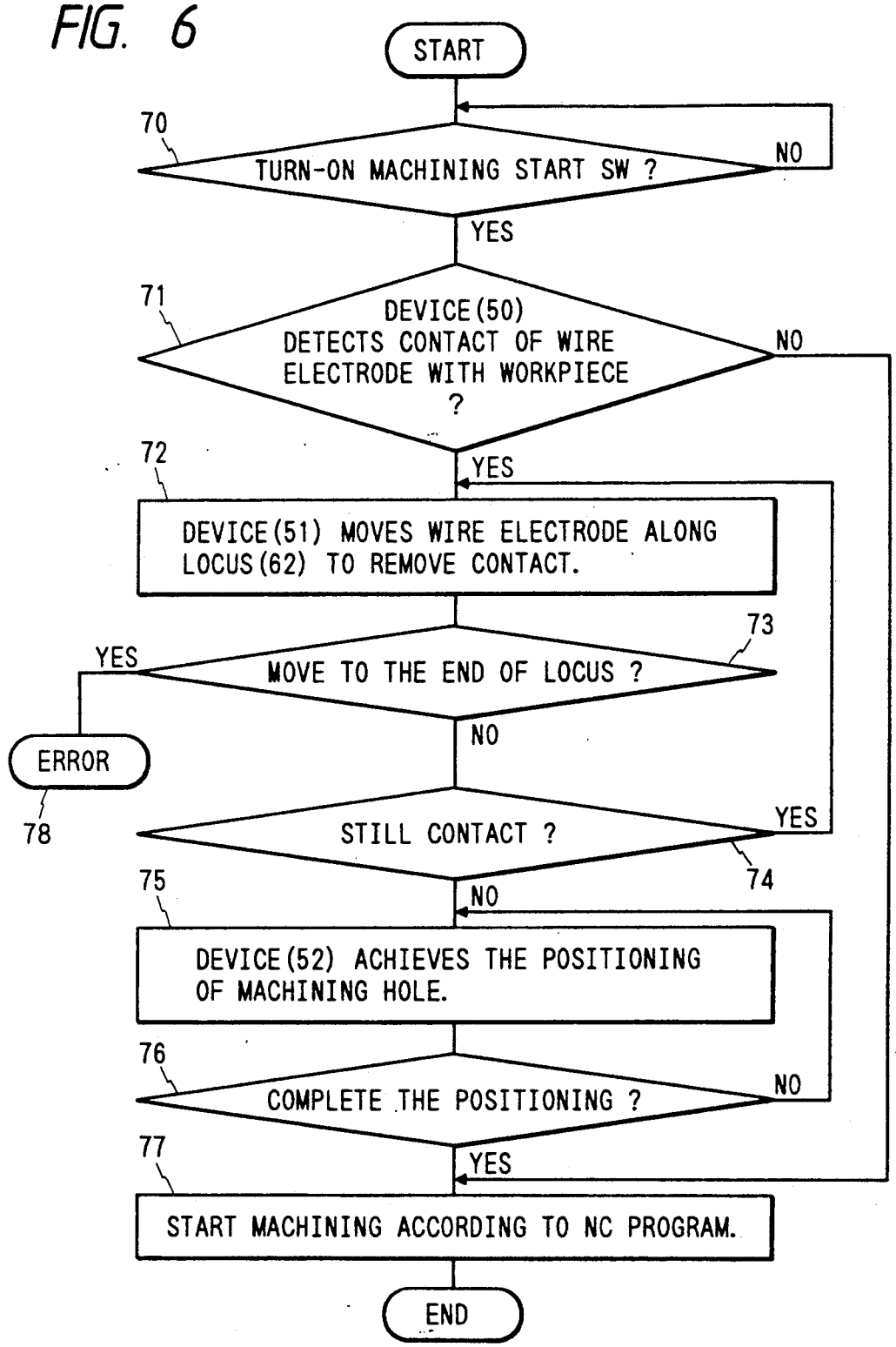

WIRE CUT TYPE ELECTRIC DISCHARGE MACHINE

BACKGROUND OF THE INVENTION

This invention relates to a wire cut type electric discharge machine which can start an electric discharge machining operation even if its wire electrode is in contact with a workpiece at a machining start position.

FIG. 1 shows the arrangement of a conventional wire cut type electric discharge machine. In FIG. 1, reference numeral 1 designates a workpiece to be machined; 2, an X-Y table on which the workpiece 1 is mounted, the X-Y table being moved two-dimensionally; 3, a jig for fixing the workpiece 1 to the table 2; 4, a wire electrode; 5, a machining power source for applying a machining voltage across the workpiece 1 and the wire electrode 4; 6, an X-axis motor for moving the table 2 in an X-axis direction; 7, a Y-axis motor for moving the table 2 in a Y-axis direction; 8, nozzles for applying a machining solution 9 to a machining gap formed between the workpiece 1 and the wire electrode 4; 10, an NC (numerical control) device for controlling the operations of the X-axis motor 6 and the Y-axis motor 7 and the operation of the power source 5; 11, a machining solution supplying device for supplying the machining solution through the nozzles 8 to the machining gap; 12, a voltage detecting device for detecting the voltage across the workpiece 1 and the wire electrode 4 (hereinafter referred to as "an interelectrode voltage", when applicable); and 49, a perforated paper tape containing a machining numerical control program.

FIG. 2 shows the arrangement of the NC device 10 in detail. In FIG. 2, reference numeral 41 designates a CRT (cathode ray tube) on which operating conditions of the wire cut type electric discharge machine are displayed; 42, an operating switch board for operating the NC device 10; 43, a machining solution control device for controlling the operation of the machining solution supplying device 11; 44, a machining power source controlling device for controlling the machining power source 5; 45, a motor controlling device for controlling the X-axis motor and the Y- axis motor; 46, a machining voltage evaluating device for evaluating the voltage detected by the voltage detecting device 12, to determine whether or not the wire electrode is in contact with the workpiece; 47, a backward movement controlling device which, when the wire electrode is brought into contact with the workpiece, moves the wire electrode backwardly along the machining locus to leave from the workpiece to start the machining operation again; 49, a perforated paper tape containing an NC program; and 48, an NC program interpreting device for interpreting an NC program (machining program) given by the paper tape 49 and a memory (not shown).

FIG. 3 is a diagram showing the positional relationship between the wire electrode and the workpiece. In FIG. 3, reference numeral 60 designates a machining start hole formed in the workpiece; 63, a machining start point where the wire electrode 4 is positioned at the start of a machining operation; and 8, the nozzles described hereinabove with reference to FIG. 4.

The operation of the electric discharge machine thus constructed will be described. A product is formed by machining the workpiece 1 as follows:

The workpiece 1 is fixedly mounted on the X-Y table 2 and the wire electrode 4 is inserted into the machining start hole 60 formed in the workpiece 1. Then, the paper tape 49 is set in the NC program interpreting device 48. Upon depression of the machining start button, the NC program interpreting device 48 starts interpreting the NC program to provide instructions to carry out a machining operation.

The machining operation is performed by using the discharge energy which is produced when a voltage is applied across the wire electrode 4 and the workpiece 1. Hence, the wire electrode 4 must be spaced from the workpiece 1 to the extent that electric discharge takes place therebetween. Even if, in the case where the wire electrode 4 is in contact with the workpiece 1, voltage is applied across them, no electric discharge occurs; that is, the machining operation is not advanced. When the wire electrode is brought into contact with the workpiece, the application of a movement instruction by the NC program interpreting device 48 is suspended, and instead the backward movement controlling device 47 supplies a movement instruction so as to move the wire electrode backwardly along the machining locus. As a result, the wire electrode 4 and the workpiece 1 are moved away from each other to remove the contact to thereby start the electric discharge again. Then, the wire electrode is returned to the position from which it has been moved backwardly. Thus, the operation of the backward movement controlling device 47 is ended. Under this condition, the machining operation is carried out again in response to a movement instruction from the NC program interpreting device 48.

The conventional wire cut type electric discharge machine thus constructed suffers from the following difficulties in forming a product by machining a workpiece: In starting a machining operation, the wire electrode 4 is inserted into the machining start hole 60. In this operation, the position of the wire electrode 4 determined by the machining program; that is, the machining start position 63 may be shifted from the machining start hole 60 as shown in FIG. 6. If, in this case, the wire electrode 4 is in contact with the workpiece 1, the machining operation will not be carried out, because the program has no locus along which the wire electrode 4 is moved backwardly to remove the contact with the workpiece, and therefore the wire electrode 4 and the workpiece 1 are maintained in contact with each other. That is, in this case, the operator must manually separate the wire electrode and the workpiece from each other, to start the machining operation.

SUMMARY OF THE INVENTION

Accordingly, an object of this invention is to eliminate the above-described difficulties accompanying a conventional wire cut type electric discharge machine. More specifically, an object of the invention is to provide a wire cut type electric discharge machine which is capable of starting a machining operation, even if the wire electrode is in contact with the workpiece at the start of the machining operation.

The foregoing object of the invention has been achieved by the provision of a wire cut type electric discharge machine which, according to the invention, comprises: detecting means for detecting whether or not a wire electrode laid along a wire electrode supplying path is in contact with a workpiece at a machining start point; and contact eliminating means which, according to a detection signal provided by the detecting means, moves the wire electrode and the workpiece relative to each other along a contact eliminating locus which has been predetermined to eliminate the contact of the wire electrode with the workpiece, and allows a predetermined machining operation to start when the contact of the wire electrode with the workpiece is eliminated.

In the wire cut type electric discharge machine, the detecting means detects whether or not the wire electrode is in contact with the workpiece at the machining start point, and in response to the detection signal of the detecting means the contact removing means operates to move the wire electrode and the workpiece relative to each other along the predetermined contact eliminating locus, and thus allows the machining operation to start upon removing of the contact of the wire electrode with the workpiece.

BRIEF DESCRIPTION OF THE DRAWINGS

In the drawings:

FIGS. 5 and 6 are an explanatory diagram and a flow chart, respectively, for a description of an operation of eliminating the contact of a wire electrode with a workpiece in the embodiment of the invention.

DESCRIPTION OF THE PREFERRED EMBODIMENTS

A wire cut type electric discharge machine, one embodiment of this invention, will be described with reference to the accompanying drawings.

Figure 4:
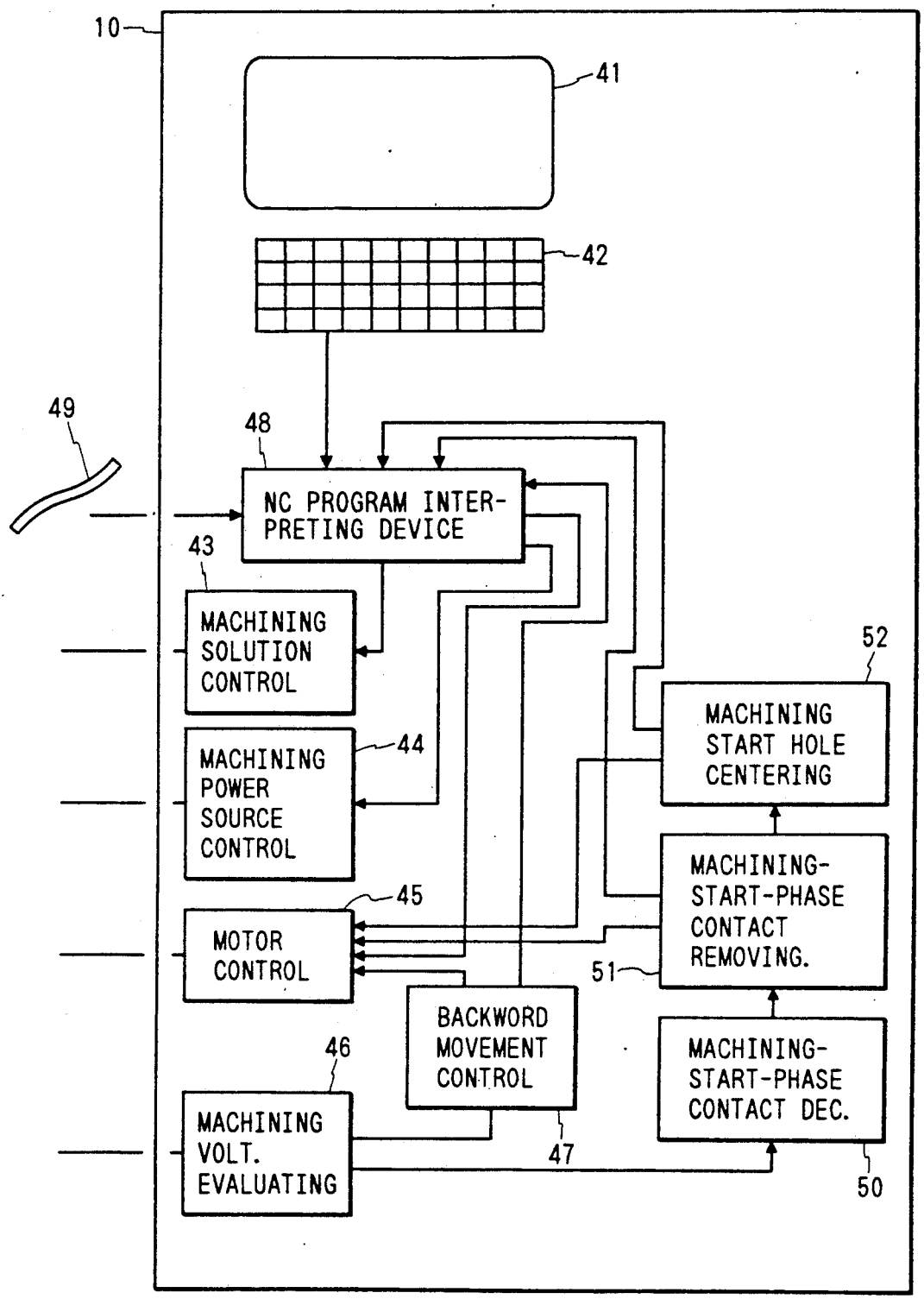
FIG. 4 is a diagram showing the arrangement of an NC device in a wire cut type electric discharge machine, one embodiment of this invention.

In FIG. 4, reference numeral 50 designates a machining-start-phase contact detecting device which is a detecting means for detecting whether or not a wire electrode 4 is in contact with a workpiece at the start of a machining operation; 51, a machining-start-phase contact removing device which is a contact eliminating means which, when the machining-start-phase contact detecting device 50 has detected that the workpiece 1 is in contact with the wire electrode 4, moves the wire electrode 4 to the position where the wire electrode 4 is not in contact with the workpiece 1 before it moves along a locus defined by an NC program; and 52, a machining start hole centering device for moving the wire electrode 4 in the machining start hole 60 formed in the workpiece two-dimensionally to the center of the hole 60.

Figure 5A:
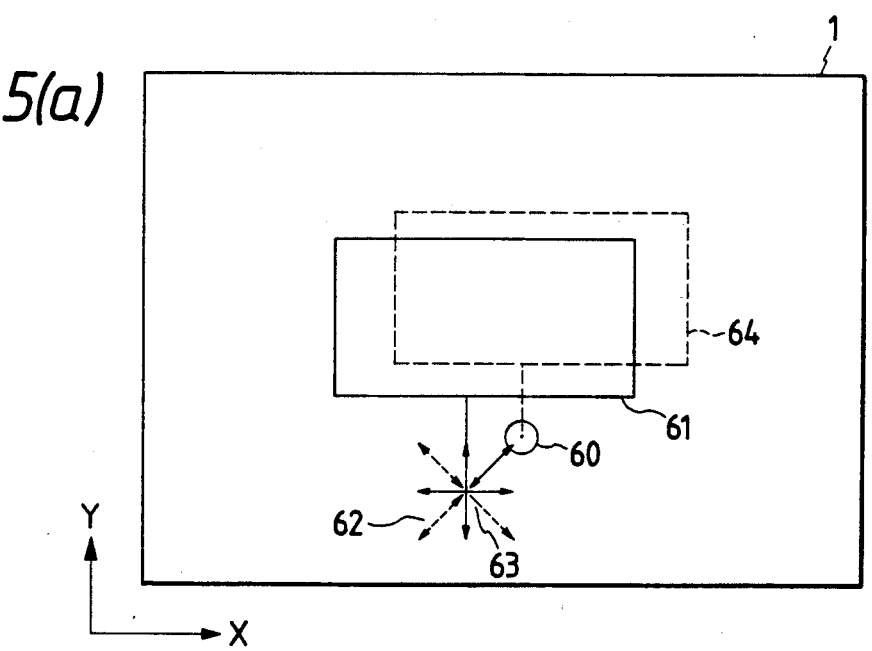
Figure 5B:
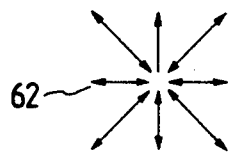
Figure 5C:
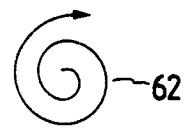

FIGS. 5(a) to 5(c) are explanatory diagrams showing a description of the operation of the embodiment of the invention. In FIG. 5(a), reference numeral 60 designates the above-described machining start hole; 61, a machining locus specified by an NC program; 62, a movement locus predetermined to eliminate the contact of the workpiece and the wire electrode; 63, a machining start point where the wire electrode 4 is positioned at the start of the machining operation, or the wire electrode is connected by an automatic wire supplying device as required; and 64, an actual machining locus.

FIG. 6 is a flow chart for a description of the operation of the embodiment of the invention.

Figure 1:
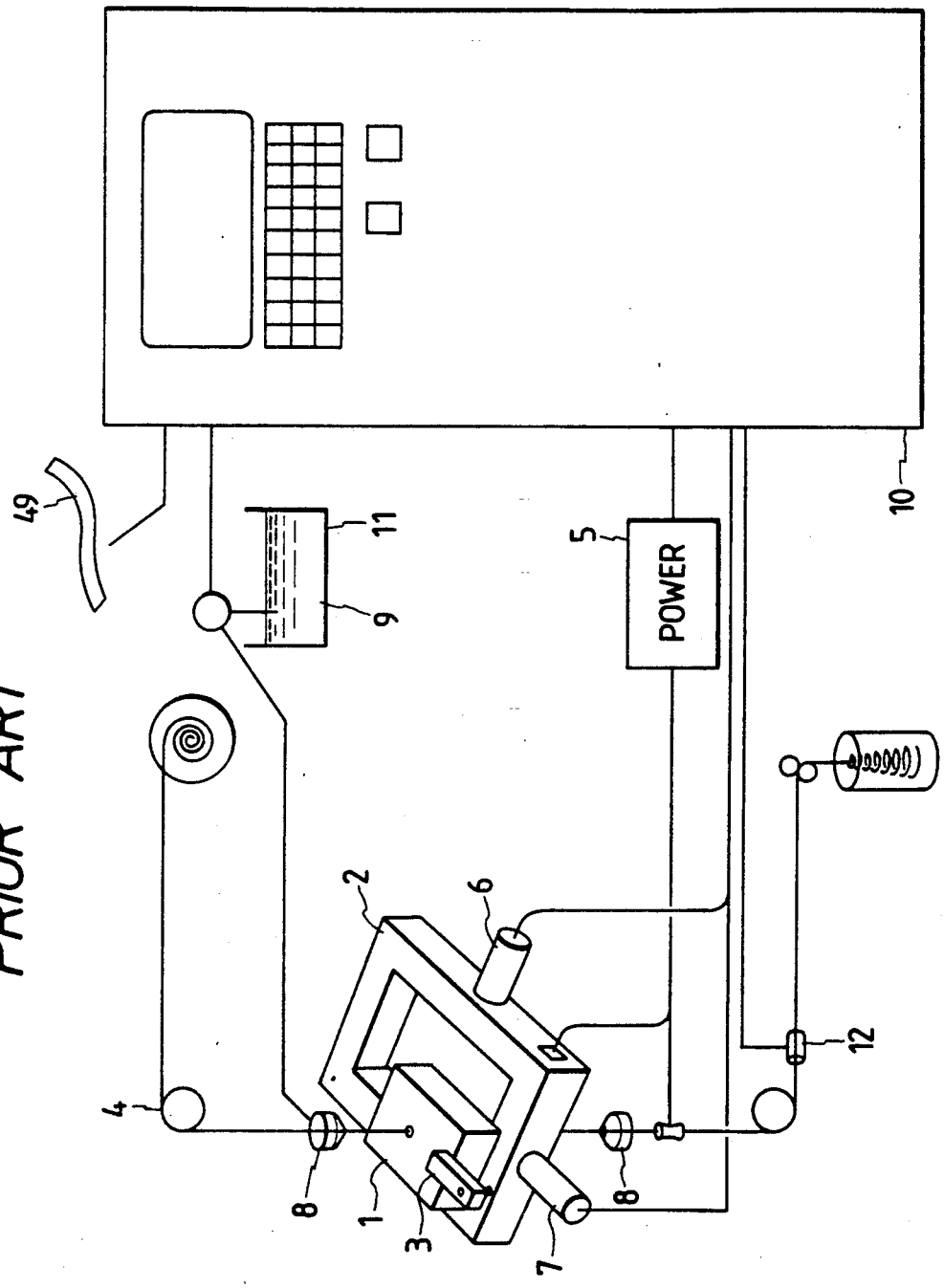
FIG 1. is a diagram showing the arrangement of a conventional wire cut type electric discharge machine.
Figure 2:
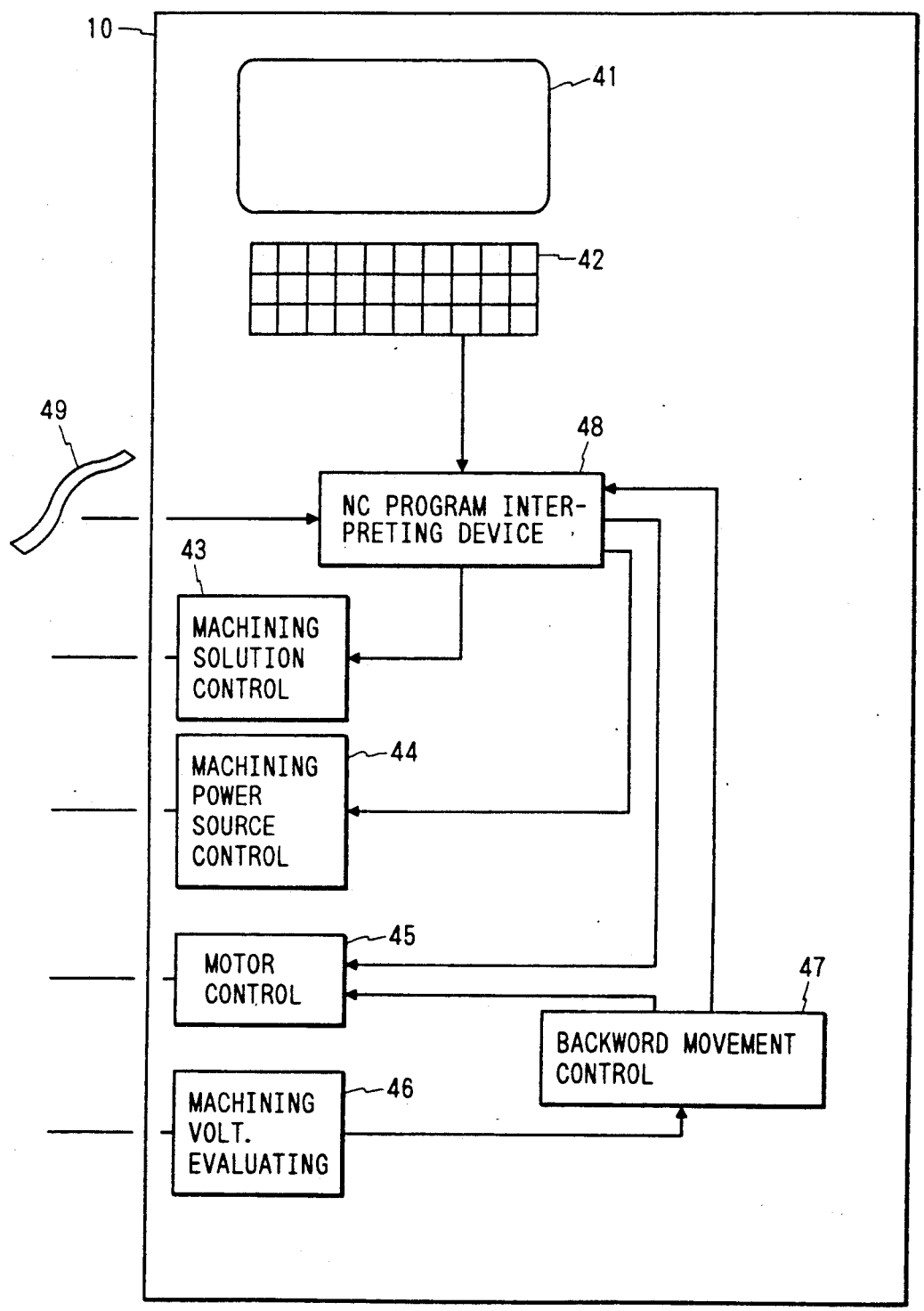
FIG. 2 is a diagram showing the arrangement of an NC device in the conventional wire cut type electric discharge machine in detail.
Figure 3:
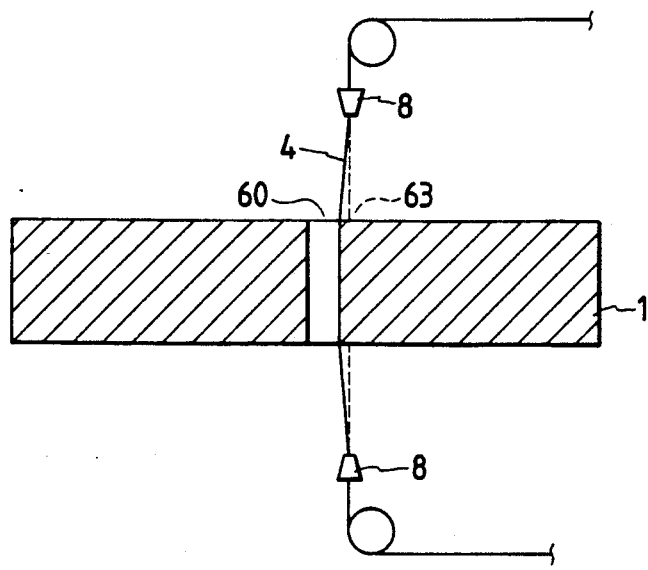
FIG. 3 is a diagram showing the positional relationship between a wire electrode and a workpiece.

The hardware of the embodiment is the same as that of the conventional wire cut type electric discharge machine described with reference to FIG. 1. In FIGS. 4, 5 and 6, parts corresponding functionally to those which have been described with reference to FIG. 1 and FIG. 2 (showing the conventional NC device 10) are therefore designated by the same reference numerals.

Now, the operation of the wire cut type electric discharge machine will be described.

The operator fixedly mounts the workpiece 1 on the X-Y table, inserts the wire electrode 4 into the machining start hole 60 manually, and then operates the machining start switch. This operation is confirmed by Step 70 in FIG. 6. In general, the NC program has an instruction for operating the machining power source at the top thereof. In response to the instruction, the machining power source is activated. At the start of the machining operation, the machining-start-phase contact detecting device 50 detects whether or not the wire electrode 4 is in contact with the workpiece. When it is determined that the wire electrode is not in contact with the workpiece, Step 77 is effected so that the machining operation is carried out along the locus specified by the NC program. That is, this is the normal case where the machining operation can be carried out even with the conventional wire cut type electric discharge machine. If it is determined in Step 71 that the wire electrode is in contact with the workpiece, then the machining-start-phase contact removing device 51 operates in Step 72. This is the abnormal case where the conventional wire cut type electric discharge machine cannot start the machining operation. The machining-start-phase contact removing device 51 moves along the movement locus 62, or a contact removing locus, which is predetermined to remove the contact of the wire electrode and the workpiece. Examples of the movement locus 62 are as shown in FIGS. 5(b) and 5(c). In FIG. 5(b), the table 2 is moved so as to move the electrode 4 radially; and in FIG. 5(c), the table 2 is moved so as to move it spirally. FIG. 5(a) shows the case where the table is moved horizontally or in a direction of the X-axis and vertically or in a direction of the Y-axis, and then at 45° with respect to the direction of the X-axis and Y-axis, to reach the machining start hole 60, so that the wire electrode is set away from the workpiece. In the case where, although the device 51 has moved along the movement locus 62, the wire electrode 4 is still maintained in contact with the workpiece, it is determined in Step 78 that an error has taken place, and the machining operation is suspended. If this error occurs in forming a plurality of products by machining the workpiece, another machining start hole is selected. When the wire electrode is aligned with the machining start hole in such a manner that it is not in contact with the workpiece, that is, the workpiece can be machined, the machining start hole centering machine 52 operates to center the wire electrode 4 in the machining start hole 60 in Step 75 (one example of the operation of centering the wire electrode). In the embodiment, the machining operation is started from the center of the machining start hole 60; however, in other cases, the operations in Steps 75 and 76 may be omitted depending on the kind of machining operation. As was described above, in the embodiment, with the wire electrode thus positioned, the machining operation is started from the center of the machining start hole 60, and the workpiece is machined along the actual machining locus 64. The actual machining locus 64 is shifted from the machining locus specified by the NC program; however, the shift will cause no trouble in extracting a product from the workpiece because the amount of shift is considerably small. Then, in Step 77, the machining operation is carried out along the locus specified by the NC program.

The remaining operations are the same as those of the conventional wire cut type electric discharge machine.

In the above-described embodiment, the operator inserts the wire electrode 4 into the machining start hole manually; however, the same effect can be obtained in the case, too, where the wire electrode is automatically inserted into the machining start hole by an automatic wire supplying device.

Furthermore, in the above-described embodiment, the machining operation is started from the machining start hole. However, the technical concept of the invention is applicable to another machining operation in which a workpiece is machined from its peripheral surface without a machining start hole.

In addition, in the above-described embodiment, one product is formed by machining one workpiece. However, it goes without saying that, in the case of extracting a plurality of products from one workpiece, the above-described operation is carried out for each of the products with the same effects.

As was described above, in the wire cut type electric discharge machine, the detecting means operates to detect whether or not the wire electrode is in contact with the workpiece at the machining start point, and, in response to the detection signal outputted by the detecting means, the contact removing means moves the wire electrode and the workpiece relative to each other along the predetermined contact eliminating locus, so that the machining operation is carried out when the contact is eliminated. Hence, with the machine of the invention, the machining operation can be started even if the wire electrode is in contact with the workpiece at the start point, and the difficulty that the operator must manually eliminate the contact of the wire electrode with the workpiece is overcome. Thus, the electric discharge machine of the invention is high both in work efficiency and in operability.

What is claimed is:

1. A wire cut type electric discharge machine comprising:

detecting means for detecting whether or not a wire electrode laid along a wire electrode supplying path is in contact with a workpiece to be machined before any relative motion takes place between said wire electrode and said workpiece at a machining start point; and contact removing means which, according to a detection signal provided by said detecting means, moves said wire electrode and said workpiece relative to each other along a contact removing locus which has been predetermined to remove the contact of said wire electrode with said workpiece, to thereby allow a predetermined machining operation to start when the contact of said wire electrode with said workpiece is removed.

2. A method for starting a machining operation in a wire cut type electric discharge machine operating according to an NC program comprising the steps of:

detecting whether or not a wire electrode laid along a wire electrode supplying path is in contact with a workpiece to be machined at an initial stage of the machining operation before any relative motion takes place between said wire electrode and said workpiece;

moving a table carrying said workpiece thereon along a predetermined contact removing locus to remove the contact of said wire electrode with said workpiece in response to the detection result;

detecting whether or not the position of said wire electrode coincides with an initial position of machining which has been determined according to the NC program; and starting the machining operation according to the NC program when the position of said wire electrode reaches said initial position.

3. The method of claim 2 wherein the initial position of the machining which has been determined according to the NC program is a machining start hole which is made in said workpiece in advance.

4. The method of claim 2 wherein the predetermined contact removing locus is a radial pattern.

5. The method of claim 2 wherein the predetermined contact removing locus is a spiral pattern.

* * * * *